US008180559B2

(12) United States Patent  
Jaffe et al.

(10) Patent No.: US 8,180,559 B2
(45) Date of Patent: May 15, 2012

(54) SYSTEM AND METHODS FOR GEOBOUNDARY BASED TRAFFIC MONITORING USING QUICK TEAR DOWN BOUNDARIES

(75) Inventors: Stephen E. Jaffe, Canton, GA (US); Sri Ramanathan, Lutz, FL (US); Matthew A. Terry, Dunwoody, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 12/371,059

(22) Filed: Feb. 13, 2009

(65) Prior Publication Data

US 2010/0211300 A1 Aug. 19, 2010

(51) Int. Cl.  
*G08G 1/01* (2006.01)

(52) U.S. Cl. ........................................ 701/119

(58) Field of Classification Search .................. 701/119, 701/117, 200, 204, 207; 340/933, 936, 992, 340/994; 455/456.1, 456.2, 456.3, 456.5, 455/456.6, 99  
See application file for complete search history.

(56) References Cited

U.S. PATENT DOCUMENTS

| | | | |
|---|---|---|---|
| 6,594,576 B2 * | 7/2003 | Fan et al. ...................... 701/117 |
| 6,675,085 B2 * | 1/2004 | Straub ............................. 701/93 |
| 7,002,489 B1 * | 2/2006 | Denker et al. ................ 340/988 |
| 7,246,007 B2 | 7/2007 | Ferman | |
| 7,260,472 B2 | 8/2007 | Sutardja | |
| 7,269,505 B2 | 9/2007 | Zhao et al. | |
| 7,277,714 B1 | 10/2007 | Mikan et al. | |
| 7,319,931 B2 | 1/2008 | Uyeki et al. | |
| 7,912,629 B2 * | 3/2011 | Sutter et al. .................. 701/118 |

* cited by examiner

*Primary Examiner* — Mark Beauchaine  
(74) *Attorney, Agent, or Firm* — Anna Linne; Roberts Mlotkowski Safran & Cole, P.C.

(57) ABSTRACT

A location based service and method configured to provide a mechanism for delivering traffic information to a subscribing user. The method is implemented on a computing infrastructure and includes setting up geo-boundaries at one or more predefined intervals. The method further includes receiving a signal from an active mobile device as it passes at least two of the geo-boundaries at the one or more predefined intervals, and determining a traffic incident from the received signal.

28 Claims, 7 Drawing Sheets

SYSTEM AND METHODS FOR GEOBOUNDARY BASED TRAFFIC MONITORING USING QUICK TEAR DOWN BOUNDARIES

FIELD OF THE INVENTION

The invention generally relates to location based services and, in particular, to a location based system that is configured to provide traffic monitoring.

BACKGROUND

Faced with an increasingly difficult challenge in growing both average revenue per user (ARPU) and numbers of subscribers, wireless carriers are trying to develop a host of new products, services, and business models based on data services. One such service is location-based services, which provide information specific to a location including actual locations of a user. It is expected that location based services will generate additional business for the carrier, from both the mobile user and content providers.

For the mobile user as well as the service provider, location-based services offer many opportunities. For example, location-based services can increase revenue of the service provider, e.g., network carrier, while improving services to end users, e.g., mobile users. Some examples of location-based services that can be provided to the mobile user include:

- Providing the nearest business or service, such as an ATM or restaurant;
- Providing weather reports which are germane to the location where the user is using the mobile device; and/or
- Providing advertisements to end users, e.g., recipients, etc.

For the network carrier, location-based services provide value add by enabling services such as:

- Resource tracking with dynamic distribution (e.g., taxis, service people, rental equipment, doctors, fleet scheduling, etc.); and
- Proximity-based notification (push or pull) (e.g., targeted advertising, buddy list, common profile matching (dating), automatic airport check-in).

Currently, wireless companies already have the ability to determine a person's location through various mechanisms. For example, some wireless devices are GPS enabled allowing them to use satellites to determine their location. In other cases, cell tower triangulation or single cell tower location is used to determine location. For more coarse-grained depths using a web browser, an IP address lookup table correlates the IP address with a specific region. This is useful if a service does not need to know the exact location of an individual, like a weather service.

Traffic monitoring systems exist in most major cities allowing emergency services to quickly identify traffic accidents and alert travelers to traffic conditions. These traffic systems monitor the average speed of vehicles on major roads by installing monitoring hardware at intervals along highway. The infrastructure costs to implement this typical traffic monitoring system are extensive and limited to major cities. Also, such monitoring hardware is difficult to install, tear down and then reinstall at other locations. In addition, the monitoring hardware does not lend itself to notifying driver's of driving conditions; instead, the monitoring hardware typically will communicate with a government entity which, in turn, may make it available to driver's on a web site or dedicated traffic channel. To obtain such information, the driver must actively request such information by going to the web site or tuning to the radio station, for example. The use of the web site, though, for example, makes it impractical to use while driving and may thus not be able to provide real time traffic information to the driver.

Accordingly, there exists a need in the art to overcome the deficiencies and limitations described hereinabove.

SUMMARY

In a first aspect of the invention, a method implemented on a computing infrastructure comprises setting up geo-boundaries at one or more predefined intervals. The method further comprises receiving a signal from an active mobile device as it passes at least two of the geo-boundaries at the one or more predefined intervals, and determining a traffic incident from the received signal.

In another aspect of the invention, a computer program product comprises a computer usable storage medium having readable program code tangibly embodied in the storage medium. The computer program product is operable to: set up geo-boundaries at one or more predefined intervals; receive a signal from an active mobile device as it passes at least two of the geo-boundaries at the one or more predefined intervals; determine a traffic incident from the received signal by calculating an average speed of a vehicle associated with the active mobile device between each of the geo-boundaries at one or more predefined intervals; identify a location of a subscribing user; and notify the subscribing user in a vicinity of the geo-boundaries at one or more predefined intervals of the traffic incident.

In another aspect of the invention, a method for providing traffic information to one or more users comprises providing a computer infrastructure. The computer infrastructure is operable to: receive a signal from an active mobile device as it passes at least two geo-boundaries at one or more predefined intervals which define a traffic zone; determine a traffic incident from the received signal by calculating an average speed of a vehicle associated with the active mobile device and comparing the average speed to an expected speed in the traffic zone; and notify the subscribing user in a vicinity of the traffic zone of the traffic incident.

In yet another aspect of the invention, a system comprises a location platform having at least hardware configured to set up geo-boundaries defining a traffic zone, receive signals from an active mobile device after it has been triggered by passing the geo-boundaries, determine a traffic incident by comparing an expected speed and a speed as calculated from the signals and notifying a subscribing user when the traffic incident when the average speed is slower than the expected speed.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention generally relates to location based services and, in particular, to a location based system that is configured to provide traffic monitoring. More specifically, the present invention relates to a traffic monitoring system and method of use which employs geo-boundaries to determine traffic patterns and/or traffic monitoring. In embodiments, the geo-boundaries allow the traffic monitoring system to significantly extend its coverage area to identify traffic incidents beyond major cities to any roadway, without the need for costly infrastructure improvements. Advantageously, it is also possible and practical to provide real time traffic information to the driver.

In implementation, the traffic monitoring system and methods will receive location and direction from a GPS enabled module located within a vehicle. The GPS module can be, for example, associated with a mobile device of the driver or other occupant. In other embodiments, the location information can be obtained from A-GPS or triangulation methods implemented with a mobile device of a occupant of the vehicle. A-GPS and triangulation methods can be implemented with a location platform provided by a service provider, for example, and implemented in a known manner such that further discussion is not required herein for a person of ordinary skill in the art to understand the invention.

The present invention can use an existing traffic information system to push relevant traffic information to any number of subscribing users based on the current location of the subscribing user and, for example, pre-programmed preferred routes allowing the subscribing user to proactively avoid traffic incidents. For example, using set predetermined distances, e.g., a mile to a few yards, or other desired granularity as the geo-boundaries, it is possible to detect traffic occurrences by, for example, dividing the posted speed limit by the distance of the geo-boundaries to determine the time to traverse such distance. In alternate embodiments, the time a tracked vehicle took to traverse the distance of the geo-boundaries can be used to calculate a speed of the vehicle. In either situation, it is possible to determine a traffic incident. For example, if the time is greater than the anticipated time or the speed is slower than the posted speed limit, there is a likelihood that there is a traffic incident, e.g., traffic accident, congestion due to road maintenance, etc. This information can then be sent to the subscribing user, with alternate route information.

In further embodiments, the traffic monitoring system and method also protects the privacy of any individual providing traffic related information. For example, in embodiments, the privacy advantage is accomplished by deleting (not caching) any persistent information about a user or vehicle. Accordingly, in embodiments, the traffic monitoring system and method provides anonymity by only tracking the time to enter and exit a traffic zone (geoboundary) and then discarding the specific device information. Thus, in preferred embodiments, the traffic monitoring system need only use geoboundary events to monitor traffic.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

- a portable computer diskette,
- a hard disk,
- a random access memory (RAM),
- a read-only memory (ROM),
- an erasable programmable read-only memory (EPROM or Flash memory),
- a portable compact disc read-only memory (CDROM), and/or
- an optical storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 1:
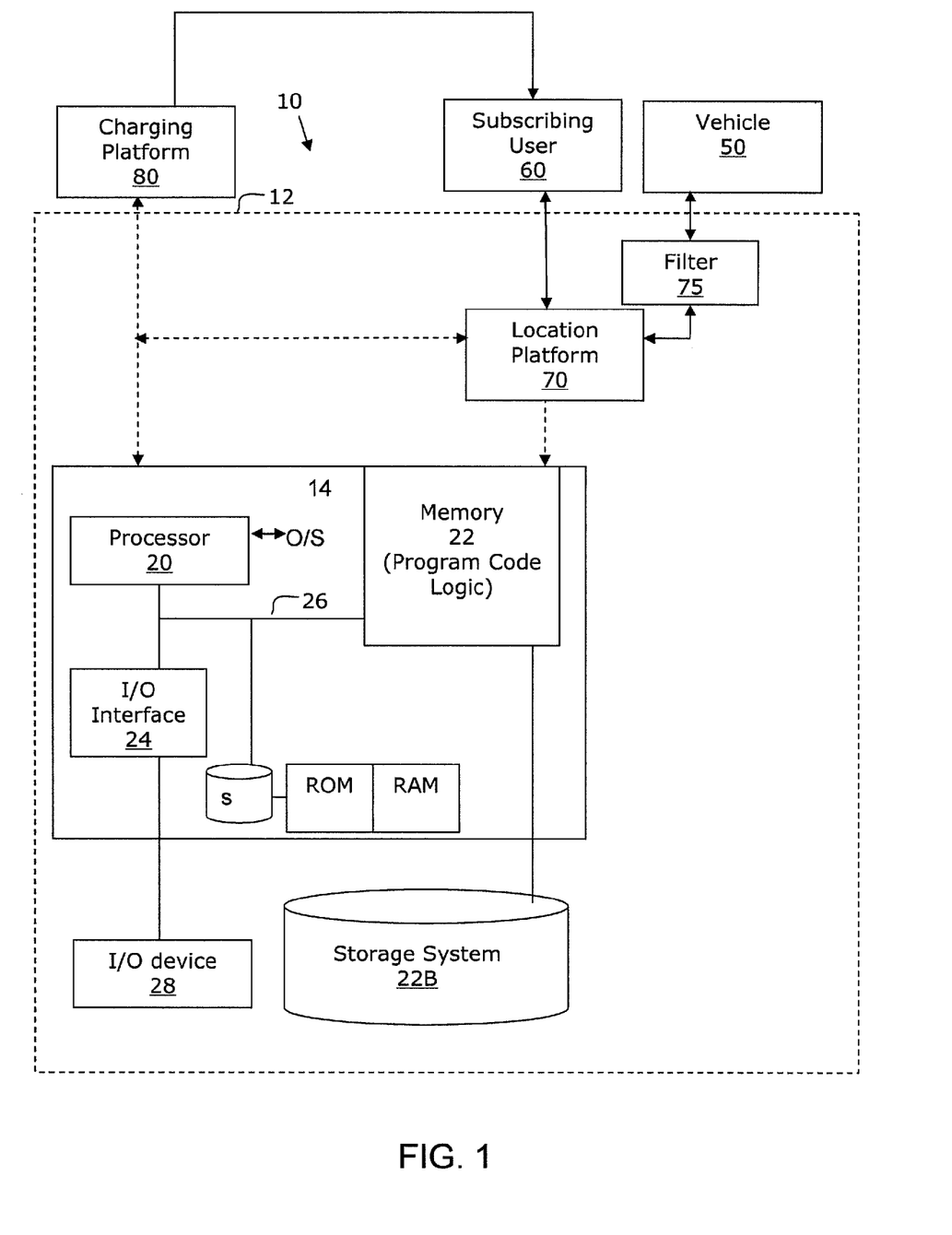
FIG. 1 shows an illustrative environment for implementing processes in accordance with the invention.

More specifically, FIG. 1 shows an illustrative environment 10 for managing the processes in accordance with the invention. To this extent, the environment 10 includes a server 12 that can perform the processes described herein. In particular, the server 12 includes a computing device 14. The computing device 14 and/or server 12 can be resident on a carrier network infrastructure or other third party service provider (any of which is generally represented in FIG. 1). By using this computing device 14, the network carrier will not have to make any significant infrastructure investments, as the pre-existing infrastructure is utilized with the present invention.

The computing device 14 and/or server 12 includes the computer program code (program code logic) configured to make computing device 14 and/or server 12 operable to perform the services described herein. The program control can be one or computing modules implemented in memory 22A or directly in memory or otherwise of the location platform 70, which is serviced and/or maintained by a service provider such as, for example, a network carrier. The location platform 70 is configured to provide a mechanism for generating geo-boundaries, receive location information of a user (e.g., vehicle 50), determine traffic conditions based on the movement of the vehicle 50, e.g., traversing the geo-boundaries, and provide traffic conditions to one or more of the subscribing users 60.

More specifically, the location platform 70 (or other service provider) can set geo-boundaries at predetermined locations. In embodiments, the geo-boundaries may be set at any distance or interval, and at any location such as, for example, an entrance and/or exit ramp, traffic lights or other traffic zone. The geo-boundaries can thus be designated as any area based on coordinates that will be monitored for location enabled devices entering and exiting such boundaries. These geo-boundaries can be designated as traffic zones for monitoring along a stretch of roadway and can be representative of an entrance and exit to a traffic zone. A single traffic zone can be used for traffic moving in opposing directions and the order in which a vehicle crosses the geo-boundaries marking the end of the traffic zone distinguishes the vehicles direction. A traffic monitor can be set-up and torn down quickly simply by defining the geo-boundaries.

Also, in embodiments, to provide a finer granularity to the traffic patterns, geo-boundaries may be set within geo-boundaries such as, for example, several boundaries within a certain distance. As an illustrative example and as discussed in further detail below, multiple geo-boundaries spaced apart from one another can be set for a specific roadway. This will allow the system and method of the present invention to localize any traffic patterns and, more specifically, any traffic incidents to a particular area.

By way of further example, geo-boundaries can be monitored by detecting when a vehicle 50 is entering or passing through each boundary. In embodiments, location information of the vehicle 50 can be obtained from an occupant's handset by A-GPS, GPS or through triangulation methods, all of which are methods known to those of skill in the art. The occupant of the vehicle can register with a service to provide such information. As an alternative and preferable mode of operation, as the vehicle traverses a set geo-boundary, a triggering event will automatically occur (e.g., the handset will be detected) at which time the location platform will obtain the location of the handset of the occupant. That is, vehicles will contain active wireless devices that will trigger geo-boundaries that designate traffic zones. The active devices will send a signal to the platform 70 or other service provider. In this way, the location platform 70 will detect the vehicle 50 as it crosses the geo-boundaries (e.g., geo-boundary cross events) and, using known information, e.g., distance traveled between geo-boundaries, posted speed limit, time to traverse the distance as deduced from a time receipt of the signal, it is possible to detect and isolate a traffic incident. For example, it is possible with such information to determine an average speed within one or more geo-boundaries.

In one illustrative non-limiting example, geo-boundaries (traffic zones) 1-10 can be set up over a mile distance, at increments of $\frac{1}{10}$ of a mile. As the vehicle begins to slow between geo-boundaries 1-4, and even slower between geo-boundaries 5-7 and then begins to resume normal speed at geo-boundary 8, it can be presumed that a traffic incident occurred between geo-boundaries (traffic zone) 5-7. The time to cross the geo-boundaries is considered the typical elapsed time taken for a vehicle to cross a traffic zone. In embodiments, the outliers (slowest or fastest times) in this calculation can be disregarded, however, in embodiments, the lowest time to cross values can still be the best indications of how freely traffic is able to cross the traffic zone. The geo-boundaries can be torn down and set up at closer intervals in order to pinpoint to a finer granularity the traffic incident.

Using this information in combination with other information such as, for example, known areas undergoing road maintenance, as received from the local department of transportation, or the typical time to cross value for each traffic zone (e.g., the expected time span required to cross a traffic zone under normal conditions), it is possible to deduce that traffic is flowing poorly due to road maintenance between geo-boundaries 5-7. In embodiments, a preset threshold of, for example, five miles per hour below the expected speed can be a triggering event to notify the subscribing user(s) 60 of the traffic incident. With this information, the location platform 70 or other service provider can notify the subscribing user(s) 60 of such traffic incident and provide them with an alternative route, known to have traffic flowing better than the current route. For example, the subscribing user(s) 60 can be notified when the subscribing user(s) are in the vicinity of the geo-boundaries, as detected by the location platform 70. The location information of the subscribing user(s) 60 may be obtained from an occupant's handset by A-GPS, GPS or through triangulation methods all of which are methods known to those of skill in the art.

In further embodiments, the system of the present invention can include filters 75 which are configured to filter traffic information, as requested by the subscribing user 60. The filters 75 can also be used by the location platform 70 to filter any extraneous information received from the vehicle 50. For example, in embodiments, any information about the vehicle 50 is unimportant to the present invention. Accordingly, as the location platform 70 or, for that matter, any of the infrastructure of the present invention does not require the identification information of the handset (e.g., mobile device) of the vehicle, it can be filtered by the filters 75. If by chance any of the personal information, e.g., ID of user, etc., is communicated to the location platform 70, it can be immediately disregarded to ensure the privacy of any occupants in the vehicle 50. As such, all caches will be cleared of such information, as it is not needed to practice the present invention.

Thus, in implementation, by using geo-boundaries to monitor traffic, roadways that were once out of reach by current traffic monitoring techniques can be monitored. Also, by implementing the present invention, it is not necessary to detect the movement of all vehicles or even a large percentage of vehicles. Instead, only a small number of vehicles is required to detect average speed and identify when a traffic event occurs.

In embodiments, other user information such as, for example, subscribing users 60, geo-boundaries, alternative routes, posted speed limits, road construction and/or other road maintenance issues, locations of lights, etc. can be saved in the database (storage unit) 22B. For example, historical traffic conditions, alternate routes for subscribers wanting to travel to work, etc. can be saved in the database 22B.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a display of a wireless handheld device of the subscribing user 28.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, a charging platform 80 is maintained to provide charging models to charge for services rendered. The charging platform 80 may be maintained, deployed, created and/or serviced by the service provider. The charging platform 80 is designed to generate a charging record for services rendered to the subscribing user 60. In embodiments, the service provider can calculate an amount to be charged, based on many different considerations and generate the charging record to be sent to the charging platform 80. In turn, the charging platform 80 can generate an invoice and/or deduct a usage charge from an account of the subscriber.

In embodiments, the invention provides a business method that performs the steps of the invention on a subscription, advertising, and/or fee basis. That is, a service provider, such as a Solution Integrator or location based service, could offer to perform the processes described herein. In this case, the service provider can create, maintain, deploy, support, etc., the computer infrastructure that performs the process steps of the invention for one or more customers. The customers may be, for example, a mobile user or a third party requesting location information. In return, the service provider can receive payment from the customer(s) under a subscription and/or fee agreement and/or the service provider can receive payment from the sale of advertising content to one or more third parties.

Exemplary Geo-Boundaries

Figure 2:
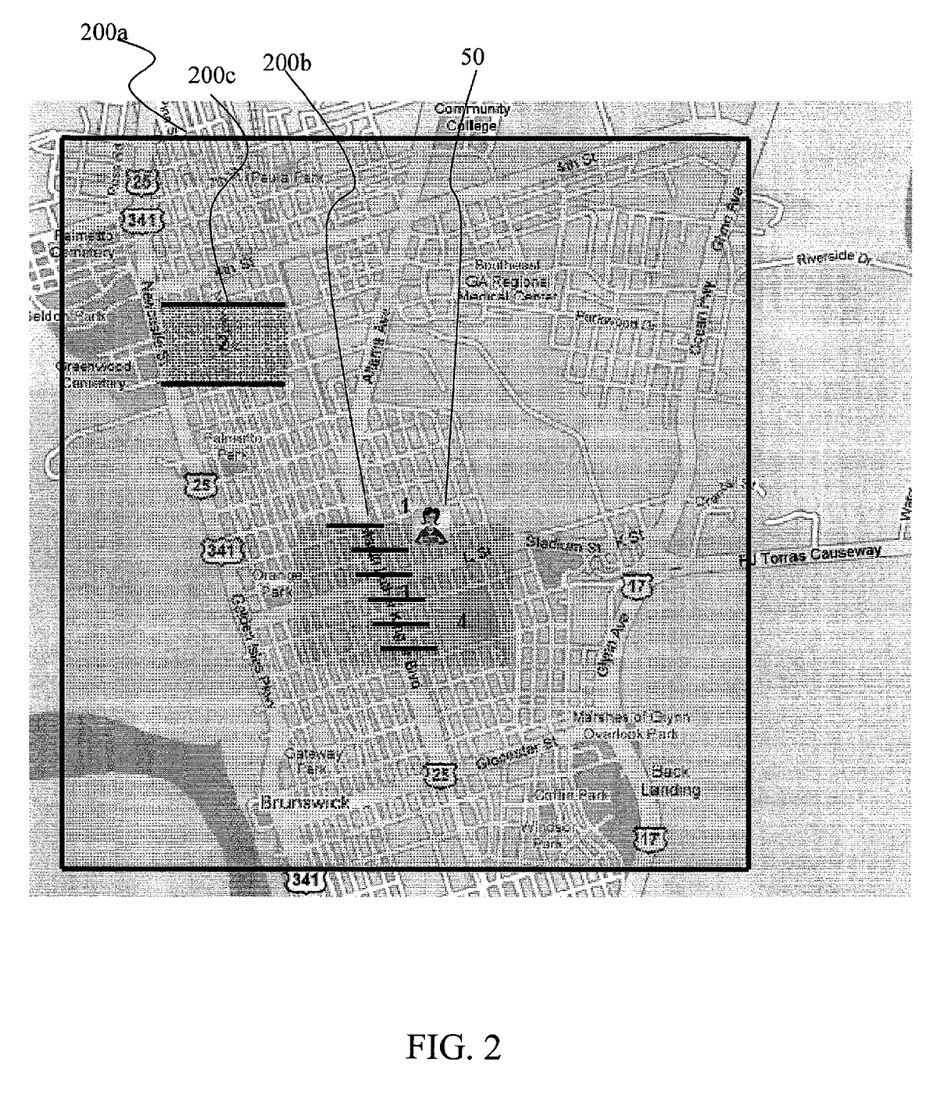
FIG. 2 shows a representative map with geo-boundaries in accordance with aspects of the present invention.

FIG. 2 shows a representative map with geo-boundaries in accordance with aspects of the present invention. In particular, the map of FIG. 2 shows a plurality of geo-boundaries (traffic zones) 200a, 200b and 200c that can be displayed to an administrator, service provider or even the subscribing user. The geo-boundaries 200a, 200b and 200c may bound, for example, at an exit and entrance ramp, a known distance of a road, geographic features such as buildings, to name a few. In embodiments, the plurality of geo-boundaries 200a, 200b and 200c can be nested together (a boundary within a boundary as shown at reference numeral 200b) or remote from one another (as shown at 200b and 200c of FIG. 2), depending on the specific configuration.

In embodiments, the geo-boundaries 200a, 200b and 200c can be set up by the service provider or other entity. The geo-boundaries 200a, 200b and 200c can be stored in the storage system 22B or other database with other relevant information such as alternate routes in case of a traffic incident. In embodiments, the information can be updated periodically in order to change, add or otherwise modify the geo-boundaries and/or alternate routes. Advantageously, as the mobile devices of the vehicles 50 and/or subscribing users 60 are independent of the system of the invention, there is no need to make updates to individual, dedicated devices.

As noted above, the information can be provided to the subscribing user 60 based on the location of the subscribing user 60 within the geo-boundary. Once the subscribing user 60 registers and enters or nears the geo-boundary, the system of the present invention can provide traffic information to the mobile device of the subscribing user 60. The traffic information can include additional content such as, for example, an alternate route, possible reasons for the delay, an amount of delay that is expected if the subscribing user 60 remains on the route, etc. In implementation, the service provider such as the location platform, network carrier or even governmental entity (e.g., department of transportation) can regularly update the subscribing user 60 with traffic conditions, etc.

Figure 3:
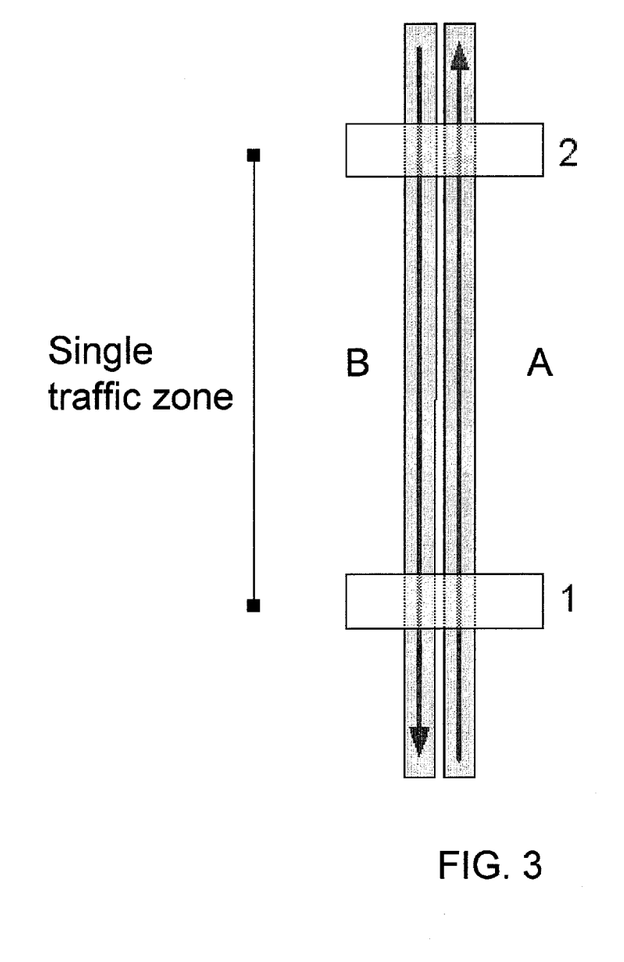
FIG. 3 shows a single traffic zone diagram in accordance with aspects of the invention.

FIG. 3 shows a single traffic zone diagram in accordance with aspects of the invention. As shown in FIG. 3, for example, the traffic zone is marked on both sides by geo-boundary 1 and geo-boundary 2. Traffic moving in direction of arrow "A" will be identified by crossing geo-boundary 1 and then geo-boundary 2. Traffic moving in the direction of arrow "B" will be identified by crossing geo-boundary 2 and then geo-boundary 1.

Figure 4:
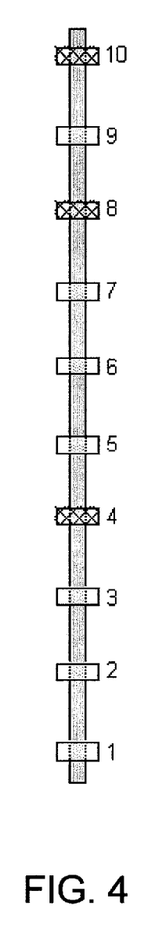
FIG. 4 shows a multiple traffic zone diagram in accordance with aspects of the invention.

FIG. 4 shows a multiple traffic zone diagram in accordance with aspects of the invention. In FIG. 4, each geo-boundary marks an edge of two adjacent traffic zones allowing continuous coverage. For example, zones can be identified by the pairings of 1-2, 2-3, 3-4, 4-5, 5-6, 6-7, 7-8, 8-9 and 9-10. Alternatively, zones can be identified by the numbers, 1-10, depending on the desired granularity. Alternatively, zones can be identified and monitored in any combination. In FIG. 4, the cross hatching at zone 4, 8 and 10 can be indicative of a traffic incident.

Exemplary Timing Diagrams

Figure 5:
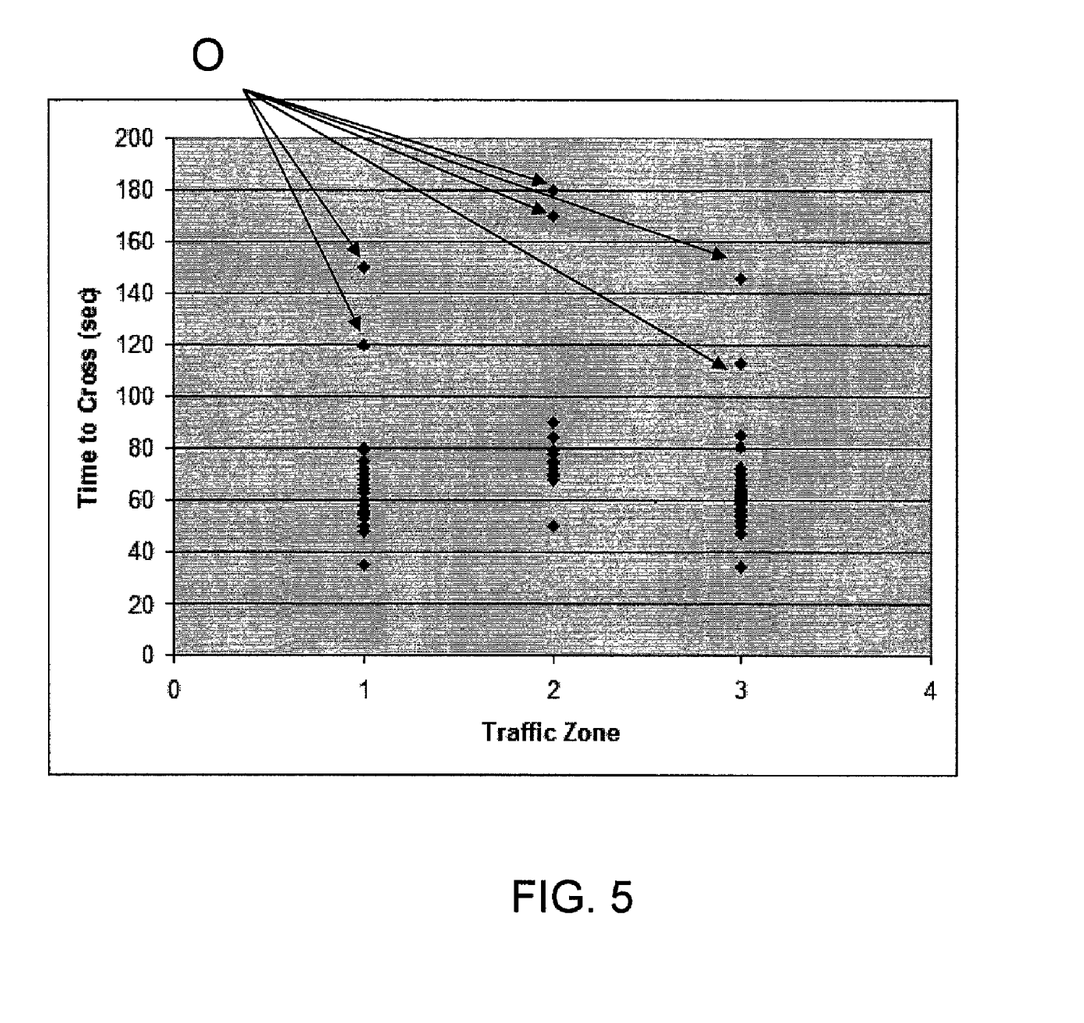
FIG. 5 shows a time diagram representative of a typical time to cross traffic zones in accordance with aspects of the invention.

FIG. 5 shows a time diagram representative of a typical time to cross traffic zones in accordance with aspects of the invention. The time diagram of FIG. 5 can be displayed to an administrator, service provider or even the subscribing user. In the example of FIG. 5, this diagram shows 4 traffic zones on the "X" axis, represented by traffic zones 1, 2, 3, 4. The "Y" axis represents time to cross each zone in seconds. The time diagram of FIG. 5 represents an illustration of expected or typical time to cross traffic zones heading in a single direction. Ignoring the outliers, represented by "O", the typical time to cross can be identified by the grouping of points with the lowest time to cross value.

Figure 6:
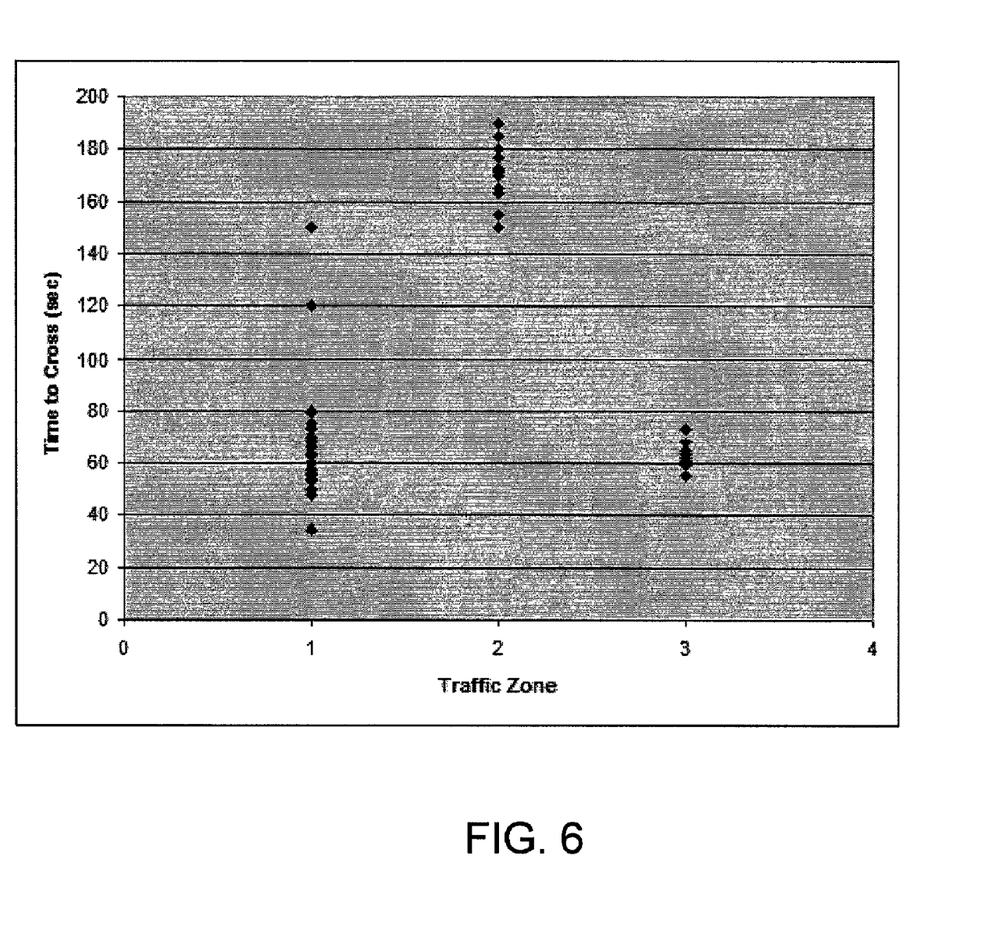
FIG. 6 shows a time diagram representative of times to cross traffic zones with at least one zone experiencing a traffic event in accordance with aspects of the invention.

FIG. 6 shows a multiple traffic zone diagram in accordance with aspects of the invention. The time diagram of FIG. 6 can be displayed to an administrator, service provider or even the subscribing user. More specifically, FIG. 6 shows the same traffic zones as FIG. 5, but after experiencing a traffic even in Zone 2. As shown, the time to cross value of traffic zone 2 has increased significantly compared to the expected value of FIG. 5. Also, the volume of traffic passing through traffic zone 3 has decreased but the time to cross value has remained consistent with the typical time to cross value at FIG. 5.

Figure 7:
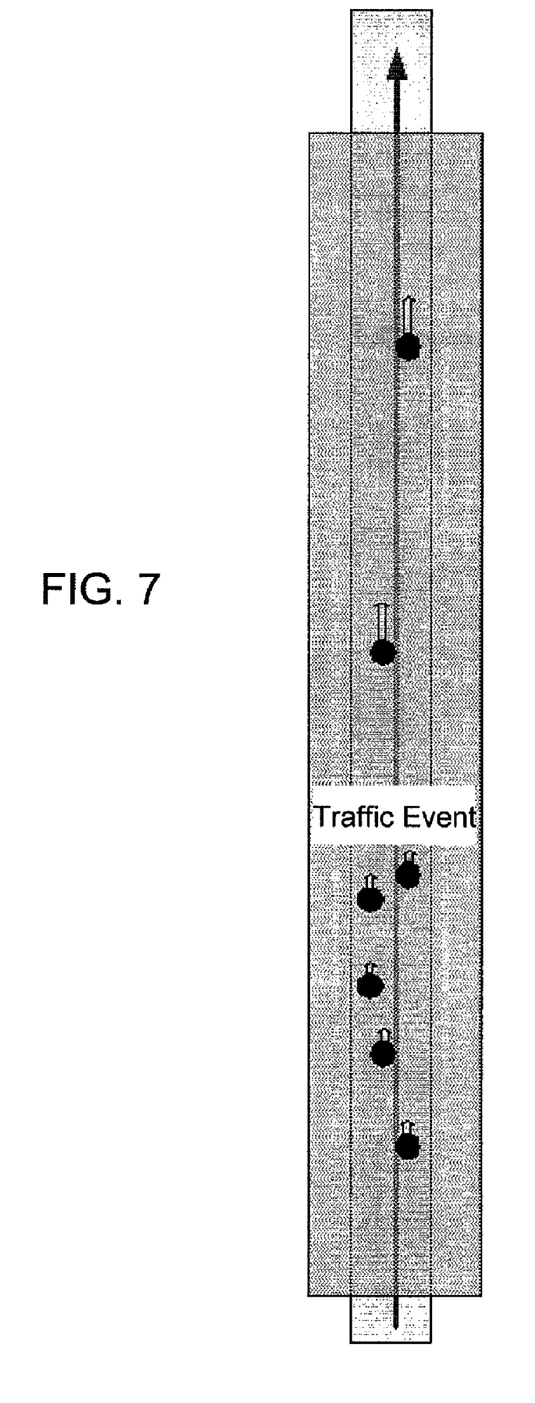
FIG. 7 shows a diagram depicting a traffic zone that has experienced a traffic event slowing traffic.

FIG. 7 shows a diagram depicting a traffic zone detail for a traffic zone that has experienced a traffic event slowing traffic in accordance with aspects of the invention. As shown, each vehicle with a location-enabled device is displayed along with their position, speed, and current direction. This is accomplished by identifying what location aware devices are within the traffic zone as the devices are tracked crossing the geo-boundary into the traffic zone, but not exited. In an alternative method, the system and method can create a full geo-boundary that covers the traffic zone and have the location platform identify all devices in the traffic zone. After the list of devices has been identified, the location platform can provide a current location, speed, and direction of each device in accordance with aspects of the invention as discussed above. The traffic event can be isolated by determining where the vehicles are close together and moving slowly versus where the vehicles are more spread out and moving quickly. The diagram of FIG. 7 can be displayed to an administrator, service provider or even the subscribing user.

Exemplary Processes

Figure 8:
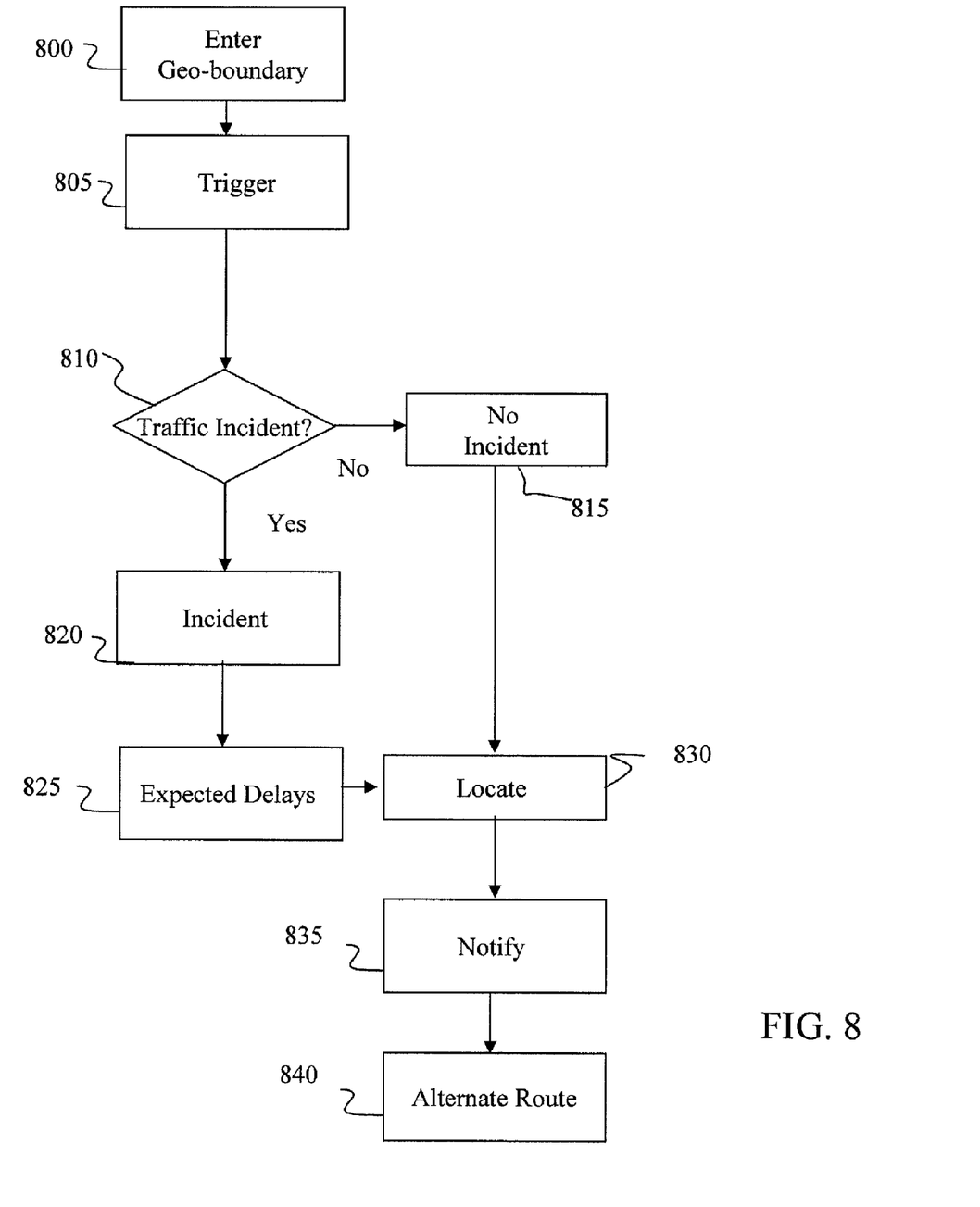
FIG. 8 is a flow diagram showing a process to publish location information using SIP based protocol in accordance with aspects of the present invention.

FIG. 8 is an illustrate exemplary process in accordance with the present invention. The steps of FIG. 8 may be implemented on the computer infrastructure of FIG. 1. The flow diagram in FIG. 8 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagrams, and combinations of the flow diagrams illustrations can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Referring to FIG. 8, at step 800, the traffic monitoring system will set up geo-boundaries at a desired location and at desired intervals. The geo-boundaries can be set up at intervals such as, for example, every $10^{th}$ of one mile or other interval. In further embodiments, the geo-boundaries can easily be torn down and reset at any desired location. At step 805, the traffic monitoring system will trigger an active device in a vehicle as it passes through the geo-boundaries (e.g., enters and exits). The active device will then send a signal (information) to the traffic-monitoring device in order to calculate an average speed of the vehicle. At step 810, the traffic monitoring system will determine if there is a traffic incident by calculating, e.g., an average speed of the vehicle (using the time receipt of the signal and the known distance the vehicle traversed between geo-boundaries (within a traffic zone)). For example, this can be accomplished by checking the time a vehicle will take to cross two geo-boundaries at a known distance. More specifically, if the average speed is the expected speed, then the traffic monitoring system will determine that there is no traffic incident at step 815. If the average speed is less than the average speed, then the traffic monitoring system will determine that there is a traffic incident at step 820. At optional step 825, the traffic monitoring system can query a database and determine if there are any expected delays at the location. These expected delays can be, for example, road work delays posted by a department of transportation for the locale.

At step 830, the traffic monitoring system will determine or detect the location of a subscribing user using any of the methods described above. As the subscribing user is nearing any of the geo-boundaries, the traffic monitoring system will notify the subscribing user of any traffic events (e.g., traffic incident vs. no traffic incident). This notification can be provided by a message directly to the handset of the subscribing user, whether it be a text message or other alert. In embodiments, the message can also be displayed on a device in the vehicle such as, for example, the vehicle's navigation system. In this way, the traffic monitoring system can provide real-time assessment or control of changes in traffic signal timings, on-ramp and off ramps, traffic lights, etc.

In optional step 835, the traffic monitoring system can provide an alternate route for the vehicle. This information can be provided when, for example, the vehicle has registered a final destination with the traffic monitoring system, location platform or other service provider.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A method implemented on a computing infrastructure, comprising:
   setting up geo-boundaries at one or more predefined intervals;
   receiving a signal from an active mobile device as it passes at least two of the geo-boundaries at the one or more predefined intervals;
   determining a traffic incident from the received signal and a posted speed limit for a vehicle associated with the active mobile device;
   determining an anticipated time for the vehicle to traverse a distance between the at least two of the geo-boundaries by dividing the posted speed limit by the distance;
   determining an actual time for the vehicle to traverse the distance; and
   determining the traffic incident between the at least two of the geo-boundaries when the actual time is greater than the anticipated time.

2. The method of claim 1, further comprising sending the traffic incident to a subscribing user in a vicinity of the geo-boundaries.

3. The method of claim 1, further comprising calculating an average speed of a vehicle based on a time of receiving the signal.

4. The method of claim 1, wherein the geo-boundaries are traffic zones.

5. The method of claim 1, further comprising triggering the active mobile device as it passes the geo-boundaries at one or more predefined intervals in order receive the signal from the active mobile device.

6. The method of claim 1, further comprising filtering out identification information of the active mobile device.

7. The method of claim 1, wherein the determining comprises calculating an average speed of a vehicle based on the signal as the active mobile device passes each of the geo-boundaries and comparing the average speed to an expected speed.

8. The method of claim 1, further comprising providing an alternate route.

9. The method of claim 8, further comprising adding additional geo-boundaries in order to pinpoint to a finer granularity the traffic incident.

10. The method of claim 1, further comprising charging a subscribing user for receipt of the traffic incident.

11. The method of claim 1, wherein location information of a subscribing user is obtained from at least one of a GPS coordinate, A-GPS coordinate and triangulation methodologies.

12. The method of claim 1, wherein the steps of claim 1 are provided on a computing infrastructure which is at least one of maintained, deployed, created and supported by a service provider.

13. The method of claim 1, wherein the steps of claim 1 are provided on a software component, a hardware component or a combination of the software component and the hardware component.

14. The method of claim 1, further comprising:
   determining an average speed of the vehicle between the at least two of the geo-boundaries; and
   determining the traffic incident between the at least two of the geo-boundaries when the average speed is slower than the posted speed limit.

15. The method of claim 14, further comprising determining the traffic incident between the at least two of the geo-boundaries upon receipt of information of one or more areas undergoing road maintenance between the at least two of the geo-boundaries.

16. The method of claim 15, further comprising:
   determining another average speed of the vehicle between another two of the geo-boundaries at the one or more predefined intervals; and
   determining the traffic incident by comparing the another average speed to the average speed.

17. A computer program product comprising a computer usable storage medium having readable program code tangibly embodied in the storage medium, the computer program product being operable to:
   set up geo-boundaries at one or more predefined intervals;
   receive a signal from an active mobile device as it passes at least two of the geo-boundaries at the one or more predefined intervals;
   determine a traffic incident from the received signal and a posted speed limit for a vehicle associated with the active mobile device by calculating an average speed of the vehicle between each of the geo-boundaries at one or more predefined intervals;
   identify a location of a subscribing user;
   notify the subscribing user in a vicinity of the geo-boundaries at one or more predefined intervals of the traffic incident;

determine an anticipated time for the vehicle to traverse a distance between the at least two of the geo-boundaries by dividing the posted speed limit by the distance;

determine an actual time for the vehicle to traverse the distance; and determine the traffic incident between the at least two of the geo-boundaries when the actual time is greater than the anticipated time.

18. The computer program product of claim 17, wherein the computer program product is further operable to tear down any of the geo-boundaries.

19. The computer program product of claim 17, wherein the setting up geo-boundaries at one or more predefined intervals includes adding geo-boundaries to further pinpoint the traffic incident.

20. The computer program product of claim 17, wherein the computer program product is further operable to add additional geo-boundaries to pinpoint the traffic incident.

21. The computer program product of claim 17, wherein the computer program product is further operable to provide alternate route information to the subscribing user.

22. The computer program product of claim 17, wherein the computer program product is further operable to determine a traffic incident by comparing the average speed to an expected speed.

23. The computer program product of claim 17, wherein the computer program product is provided on a computing infrastructure which is at least one of maintained, deployed, created and supported by a service provider on a fee and/or subscription basis.

24. A method for providing traffic information to one or more users, comprising:

providing a computer infrastructure being operable to:

receive a signal from an active mobile device as it passes at least two geo-boundaries at one or more predefined intervals which define a traffic zone;

determine a traffic incident from the received signal and a posted speed limit for a vehicle associated with the active mobile device by calculating an average speed of the vehicle between the geo-boundaries and comparing the average speed to the posted speed limit in the traffic zone;

notify the subscribing user in a vicinity of the traffic zone of the traffic incident;

determine an anticipated time for the vehicle to traverse a distance between the at least two geo-boundaries by dividing the posted speed limit by the distance;

determine an actual time for the vehicle to traverse the distance; and determine the traffic incident between the at least two geo-boundaries when the actual time is greater than the anticipated time.

25. The method of claim 24, wherein the steps are provided on a software component, a hardware component or a combination of the software component and the hardware component.

26. The method of claim 24, wherein the computer infrastructure is further operable to charge the subscribing user for the notification.

27. A system comprising:

a location platform having at least hardware configured to:

set up geo-boundaries defining a traffic zone;

receive signals from an active mobile device after it has been triggered by passing the geo-boundaries;

determine a traffic incident by comparing a posted speed limit for a vehicle associated with the active mobile device and an average speed as calculated from the signals;

notify a subscribing user of the traffic incident when the average speed is slower than the posted speed limit;

determine an anticipated time for the vehicle to traverse a distance between at least two of the geo-boundaries by dividing the posted speed limit by the distance;

determine an actual time for the vehicle to traverse the distance; and determine the traffic incident between the at least two of the geo-boundaries when the actual time is greater than the anticipated time.

28. The system of claim 27, wherein the location platform is configured to provide alternate route information to the subscribing user.

\* \* \* \* \*